(12) United States Patent
Rogers

(10) Patent No.: US 6,491,065 B1
(45) Date of Patent: *Dec. 10, 2002

(54) SURGE SUPPRESSION APPARATUS

(75) Inventor: John Anthony Rogers, Dorset (GB)

(73) Assignee: Lombard Pressings Limited, Swansea (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/643,994

(22) Filed: Aug. 23, 2000

(30) Foreign Application Priority Data

Aug. 27, 1999 (GB) .............................. 9920212

(51) Int. Cl.⁷ ................................. F16L 55/04
(52) U.S. Cl. ........................................ 138/30; 138/31
(58) Field of Search ..................... 138/30, 31

(56) References Cited

U.S. PATENT DOCUMENTS

| | | | | |
|---|---|---|---|---|
| 3,628,573 A | * | 12/1971 | Loliger et al. | 138/30 |
| 4,088,154 A | * | 5/1978 | Patton et al. | 138/30 |
| 4,163,461 A | * | 8/1979 | Jacobellis | 138/30 |
| 4,195,668 A | * | 4/1980 | Lewis | 138/30 |
| 4,407,330 A | * | 10/1983 | Fujiwara | 138/30 |
| 4,487,226 A | * | 12/1984 | Chun | 138/30 |
| 4,556,087 A | | 12/1985 | Casilli | |
| 5,129,427 A | * | 7/1992 | White et al. | 138/30 |
| 5,797,430 A | * | 8/1998 | Becke et al. | 138/30 |
| 5,904,181 A | * | 5/1999 | Tooma et al. | 138/30 |

FOREIGN PATENT DOCUMENTS

| | | |
|---|---|---|
| DE | 40 31 239 | 4/1992 |
| EP | 0 410 125 | 1/1991 |
| EP | 0 707 173 | 4/1996 |

* cited by examiner

Primary Examiner—James Hook
(74) Attorney, Agent, or Firm—Lowe Hauptman Gilman & Berner, LLP

(57) ABSTRACT

A surge suppression apparatus includes a housing, and a flexible diaphragm. The housing is divided into first and second sub-chambers by the diaphragm. The first sub-chamber is connected to a supply of liquid under pressure. The second sub-chamber contains a gas under pressure. The apparatus further comprises a gas reservoir in communication with the second sub-chamber so as, in use, to provide an effective volume which is substantially larger than that of the second sub-chamber.

16 Claims, 1 Drawing Sheet

SURGE SUPPRESSION APPARATUS

TECHNICAL FIELD

This invention relates to a surge suppression apparatus. More particularly, but not exclusively, the invention relates to apparatus for suppressing the effects of pressure variations in a liquid, for example paint, supplied under pressure along a supply line by a reciprocating pump.

BACKGROUND ART

It is known to provide a surge suppressor which has an air sub-chamber volume which is greatly in excess of the volume of a liquid sub-chamber in order to minimise the differential pressure change experienced in the air sub-chamber resulting from the flexure of the diaphragm due to a change (normally a reduction) in the liquid supply line pressure thereby minimising any surge of the liquid, see for example European Patent Application No. EP 0 707 173 A1.

Such surge suppressors have the disadvantage of being bulky thereby limiting their usefulness in the case of large numbers of suppressors and in working environments with limited space.

It is an object of the present invention to provide a surge suppressor which mitigates this disadvantage whilst maintaining the advantages of the aforementioned known surge suppressors.

BRIEF SUMMARY OF THE INVENTION

According to the present invention there is provided a surge suppression apparatus including a housing, and a flexible diaphragm, the housing being divided into first and second sub-chambers by the diaphragm, the first sub-chamber having connection means for connecting the first sub-chamber to a supply of liquid under pressure, the second sub-chamber containing a gas under pressure and a gas reservoir being in communication with the second sub-chamber so as, in use, to provide an effective volume which is substantially larger than that of the second sub-chamber.

Conveniently said first and second sub-chambers are of similar volume when the diaphragm is in a rest position.

The second sub-chamber is provided with a pressure regulation means. Ideally the pressure regulation means is an active valve pressure regulation means. Desirably the liquid is paint. Desirably the gas reservoir is remote from the housing. Conveniently there is provided an isolation valve between the gas reservoir and the second sub-chamber.

BRIEF DESCRIPTION OF THE DRAWINGS

An embodiment of the present invention will now be described, by way of example, with reference to the accompanying drawings in which.

DESCRIPTION OF THE PREFERRED EMBODIMENT

Figure 1:
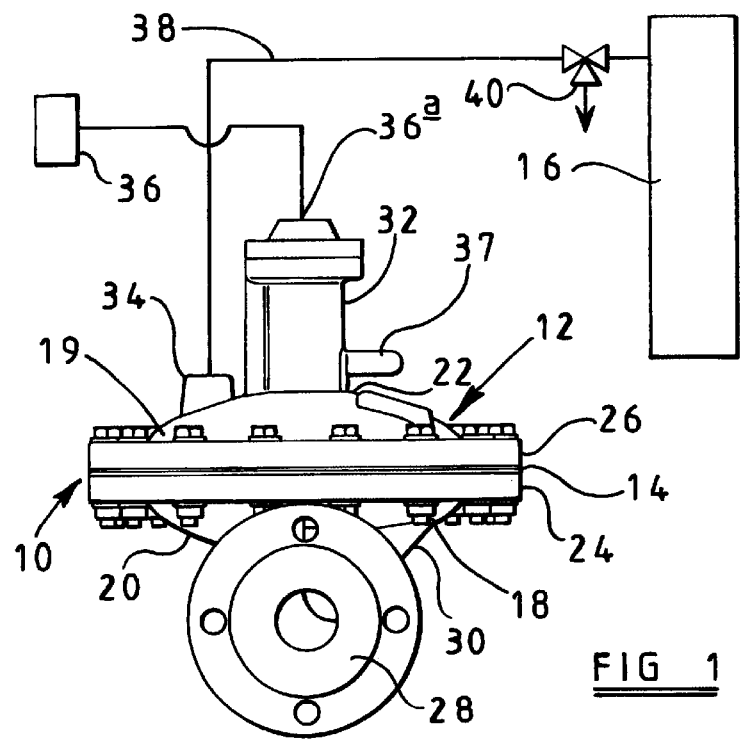
FIG. 1 is a part-schematic end view of a surge suppression apparatus according to the present invention.
Figure 2:
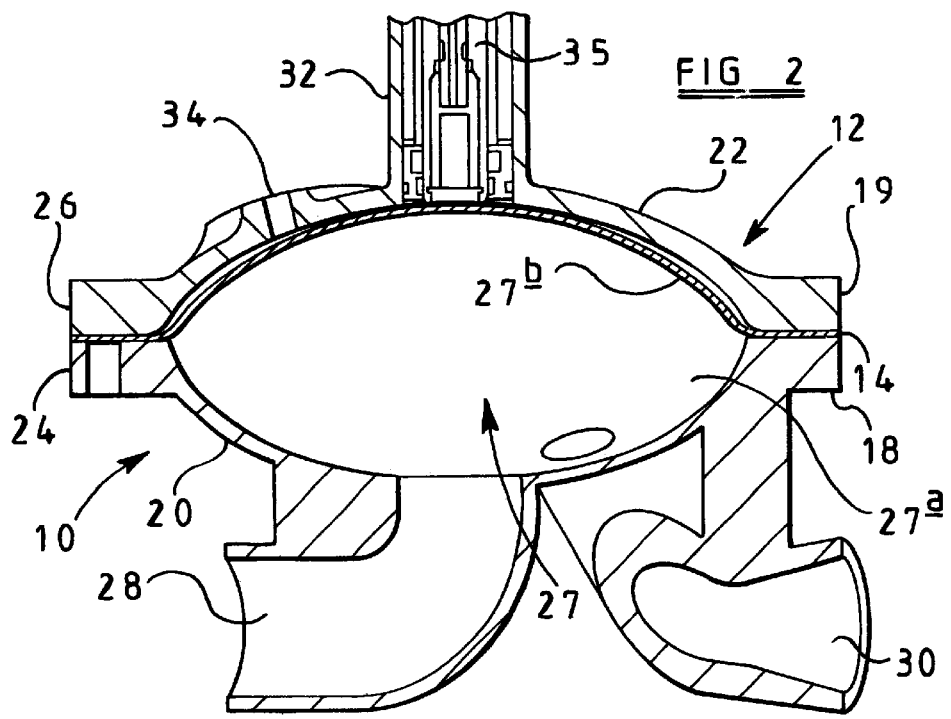
FIG. 2 is a partial sectional view of the surge suppression apparatus of FIG. 1.

A surge suppression apparatus 10 includes a housing 12, a circular, flexible diaphragm 14 and an air reservoir 16. The housing 12 comprises first and second housing components 18, 19. Each housing component 18, 19 has a convex part-spherical dished portion 20, 22 and a substantially circular rim portion 24, 26. The housing portions 18, 19 are joined at their respective rim portions 24, 26 such that their respective dished portions 20, 22 define an internal chamber 27. The diaphragm 14 is held at its periphery between the rim portions 24, 26 so as to divide the internal chamber into first and second sub-chambers 27a, 27b.

The first housing component 18, the lower component in the orientation as shown in the Figures, has an inlet union 28 and an outlet union 30 so as to, in use, allow the passage of a liquid therethrough.

The second housing component 19 has a substantially cylindrical casing 32 projecting outwardly from the highest point thereof and a connection port 34 of the internal chamber 27 juxtaposed the casing 32. The casing 32 contains a pressure regulation means 35 and has a compressed air supply 36 connected, via an inlet 36a, thereto. An outlet port 37 from the pressure regulation means 35 projects perpendicularly from the casing 32 near the base thereof.

A pipe 38 connects the air reservoir 16 to the port 34 and an isolation valve 40 is mounted in the pipe 38 close to the air reservoir 16.

In use, a reciprocating pump (not shown) is used to pump liquid through the first sub-chamber 27a via the inlet and outlet unions 28, 30. Such a reciprocating pump does not have a constant output pressure over a pump cycle. During pump stroke reversal the pressure in the first sub-chamber 27a drops momentarily causing the diaphragm 14 to be deflected downwardly, the pressure in the second sub-chamber 27b exceeding that in the first sub-chamber 27a.

The communication between the second sub-chamber 27b and the air reservoir 16 increases the volume of gas in the system and thereby increases the capacity of the apparatus to minimise variations in the pressure of fluid from the first sub-chamber 27a. It has been found that an air reservoir capacity of 8l is sufficient to smooth pressure variations from a 1.5l surge suppressor utilising any size of pump commonly used in such liquid delivery systems.

The isolation valve 40 can be used to isolate the air reservoir 16 from the surge suppressor 10 in order to permit partial venting and/or repressurisation of the system or to replace the air reservoir 16 or carry out maintenance upon the surge suppressor 10.

In a second embodiment (not shown) there is no pressure regulation means 35 and the surge suppression apparatus will be a sealed volume of pressurised gas, this is known as a static surge suppression apparatus.

What is claimed is:

1. A surge suppression apparatus, comprising:
   a flexible diaphragm;
   a housing being divided into first and second sub-chambers by said diaphragm, the first sub-chamber adapted to be connected to a liquid supply of liquid under pressure, the second sub-chamber containing a gas under pressure;
   a gas reservoir in communication with the second sub-chamber so as, in use, to provide an effective volume of a fixed size which is substantially larger than an entire internal volume of the housing which is a total of volumes of the first and second sub-chambers; and
   a gas supply of said gas under pressure directly connected to the second sub-chamber so that said gas may immediately enter the second sub-chamber, when necessary, without having first to pass through said gas reservoir.

2. The surge suppression apparatus as claimed in claim 1, wherein said first and second sub-chambers are of similar volume when the diaphragm is in a rest position.

3. The surge suppression apparatus as claimed in claim 1, further comprising an isolation valve between said gas reservoir and said second sub-chamber to permit the communication between said gas reservoir and said second sub-chamber to be broken.

4. The apparatus of claim 1, wherein said gas reservoir has a limited volume.

5. The apparatus of claim 1, wherein said gas reservoir is operatively in constant communication with the second sub-chamber.

6. The apparatus of claim 1, wherein said gas reservoir contains said gas under pressure.

7. The surge suppression apparatus as claimed in claim 1, wherein said effective volume is about five times larger than the entire internal volume of the housing.

8. The apparatus of claim 1, wherein said gas reservoir is formed as a separate unit and remote from said housing, said gas reservoir communicates with said second sub-chamber by way of a pipe.

9. The apparatus of claim 8, further comprising an isolation valve in said pipe between said gas reservoir and said second sub-chamber to permit the communication between said gas reservoir and said second sub-chamber to be broken.

10. The apparatus of claim 8, wherein said second sub-chamber comprises separate first and second ports, the first port is connected to said pipe to provide said communication with said gas reservoir, the second port is communicated with said gas supply.

11. The apparatus of claim 10, wherein the second sub chamber is provided with a pressure regulation element for controlling the gas pressure therein in use.

12. The apparatus of claim 11, wherein said pressure regulation element is installed in the second port between said gas supply and the second sub-chamber.

13. A surge suppression apparatus, comprising:
a flexible diaphragm;
a housing being divided into first and second sub-chambers by said diaphragm, the first sub-chamber adapted to be connected to a liquid supply of liquid under pressure, the second sub-chamber containing a gas under pressure;
a gas reservoir in communication with the second sub-chamber so as, in use, to provide an effective volume which is substantially larger than an entire internal volume of the housing which is a total of volumes of the first and second sub-chambers; and
a gas supply of said gas under pressure directly connected to the second sub-chamber so that said gas may immediately enter the second sub-chamber, when necessary, without having first to pass through said gas reservoir;
wherein the second sub chamber is provided with a pressure regulation element for controlling the gas pressure therein in use.

14. The surge suppression apparatus as claimed in claim 13, wherein said pressure regulation element is an active valve pressure regulation element.

15. The apparatus of claim 13, wherein said pressure regulation element is connected between said gas supply and the second sub-chamber.

16. The apparatus of claim 13, wherein said pressure regulation element includes an outlet port communicated to an outside of said housing.

* * * * *